United States Patent [19]

McPherson et al.

[11] Patent Number: 4,723,767

[45] Date of Patent: Feb. 9, 1988

[54] ROTARY POWERED LINEAR ACTUATED CLAMP

[75] Inventors: Alexander W. McPherson, Farmington Hills; Alan Harkrader, Gaylord, both of Mich.

[73] Assignee: De-Sta-Co Division, Dover Resources, Inc., Troy, Mich.

[21] Appl. No.: 894,963

[22] Filed: Aug. 8, 1986

[51] Int. Cl.[4] .................................... B23Q 3/03

[52] U.S. Cl. .................................... 269/32; 269/228

[58] Field of Search .................... 269/32, 239, 228, 91, 269/93, 94, 285, 286, 329; 254/98, DIG. 2, 424, 425

[56] References Cited

U.S. PATENT DOCUMENTS

| | | | |
|---|---|---|---|
| 2,956,188 | 10/1960 | White | 254/98 |
| 3,606,252 | 9/1971 | Dorough | 254/DIG. 2 |
| 3,888,464 | 6/1975 | Felsen | 254/425 |
| 4,418,899 | 12/1983 | Zimmermann et al. | 269/32 |
| 4,458,889 | 7/1984 | McPherson et al. | 269/32 |

*Primary Examiner*—Robert C. Watson
*Attorney, Agent, or Firm*—Lloyd M. Forster

[57] ABSTRACT

Rotary powered linear actuated clamp having hollow electric motor drive shaft coupled to threaded nut axially retained by reaction roller thrust bearings driving a linear threaded rod having integral toggle linkage actuator guided by anti-friction rollers in linear lateral reaction tracks.

24 Claims, 16 Drawing Figures

69
67
38
67

69
67
38
66
70

25a
73
25
46
29
77
72
71

29
71
72
25
46

18
64
65
64

29
77
77

ROTARY POWERED LINEAR ACTUATED CLAMP

BACKGROUND OF THE INVENTION

Conventional power actuated industrial clamps typically employ air or hydraulic linear pistons to actuate clamp arms through toggle linkage, a recent version of which is disclosed in U.S. Pat. No. 4,458,889 issued on July 10, 1984. Such clamps, as used in industrial production for repetitively holding identical work pieces during processing operations, are generally limited to a single dedicated clamping position with toggle linkage near or preferably at centered position, at which the clamp will remain locked upon release of actuating pressure and at which maximum clamping force may be exerted for a given actuating pressure. Any clamp setting appreciably short of centered toggle linkage necessitates retention of actuating pressure for the duration of clamping requirement.

In order to provide alternative electrically powered clamps, various electric motor drives have been adapted to provide clamping action, as in actuating a work clamp through worm gearing, such as disclosed in U.S. Pat. No. 2,395,242 or in actuating a tubular piston through a lead screw driven by an offset electric motor such as disclosed in U.S. Pat. No. 4,137,784.

Without application to the clamping art, certain electric motor actuated jacks or other screw actuated devices are disclosed in U.S. Pat. Nos. 733,614, 1,279,346, 1,404,862, 1,543,181, and 2,956,188, each of which has the common feature of a feed screw extending through and in axial alignment with the electric motor.

In the last of such patents, employed for valve operation, a control indicator rod extends from the tail end of the feed screw out of the motor housing in a manner having some similarity to a control feature employed in the present invention.

With regard to requirements of industrial clamps, it is a generally recognized desirable feature for the clamp to be self-locking in its clamping position to avoid the requirement for maintaining power-on actuation.

SUMMARY OF THE INVENTION

Applicants have combined the self-locking characteristics of a non-rotating, linearly displaced threaded axial rod directly driven by rotation of an axially retained nut coupled to a hollow motor shaft for actuating toggle linkage such as disclosed in said U.S. Pat. No. 4,458,889. The nut is tang driven directly by the motor shaft, axially retained by roller thrust bearings, and provided with a molded "Moglice" moly-disulphide thread for driving the linear threaded rod which has an integral link actuator guided by anti-friction rollers in a linear track for actuating the toggle linkage. The threaded actuating rod has a reduced diameter control rod projecting through the back end of the motor shaft and motor housing on which an adjustable switch trip is secured for controlling the power-on stroke of the actuator.

Maximum clamping pressure is obtained at the centered position of the toggle linkage; however, clamping at any position of the clamp arm from fully retracted to centered maximum clamping force position may be provided subject to intermediate clamping force limits progressively increasing. as the toggle linkage approaches centered position. At any clamping position there is no need for retaining actuating power during clamp retention of the work piece due to the self-locking characteristic of the nut screw actuation.

Various forms of clamping mechanism in addition to toggle linkage may be employed subject to a linear actuating connection to the threaded rod link actuator.

DETAILED DESCRIPTION OF PREFERRED EMBODIMENT

Figure 1:
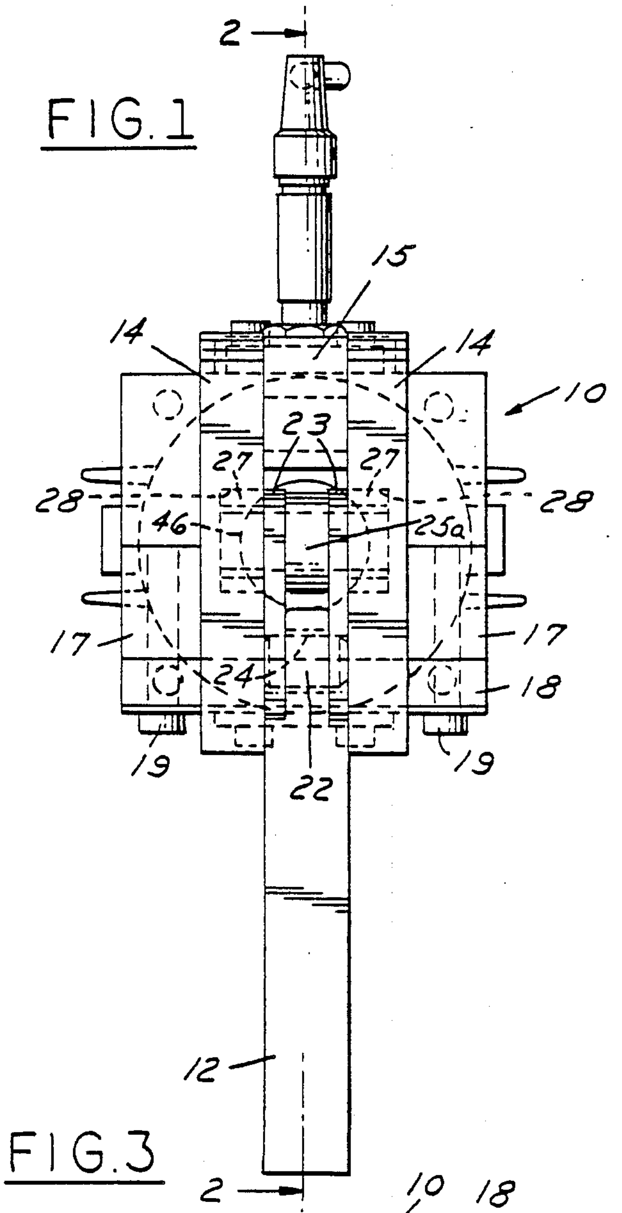
FIG. 1 is a front elevation of the preferred embodiment.
Figure 3:
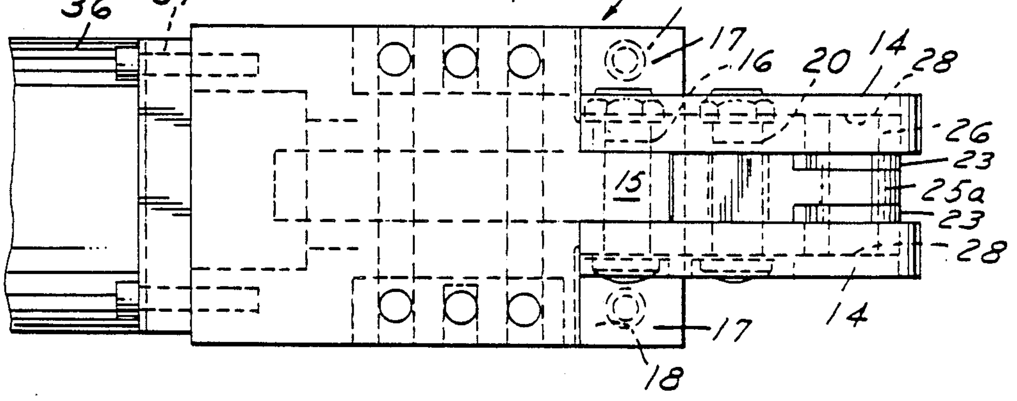
FIG. 3 is a plan view taken along the line 3—3 of FIG. 2.
Figure 2:
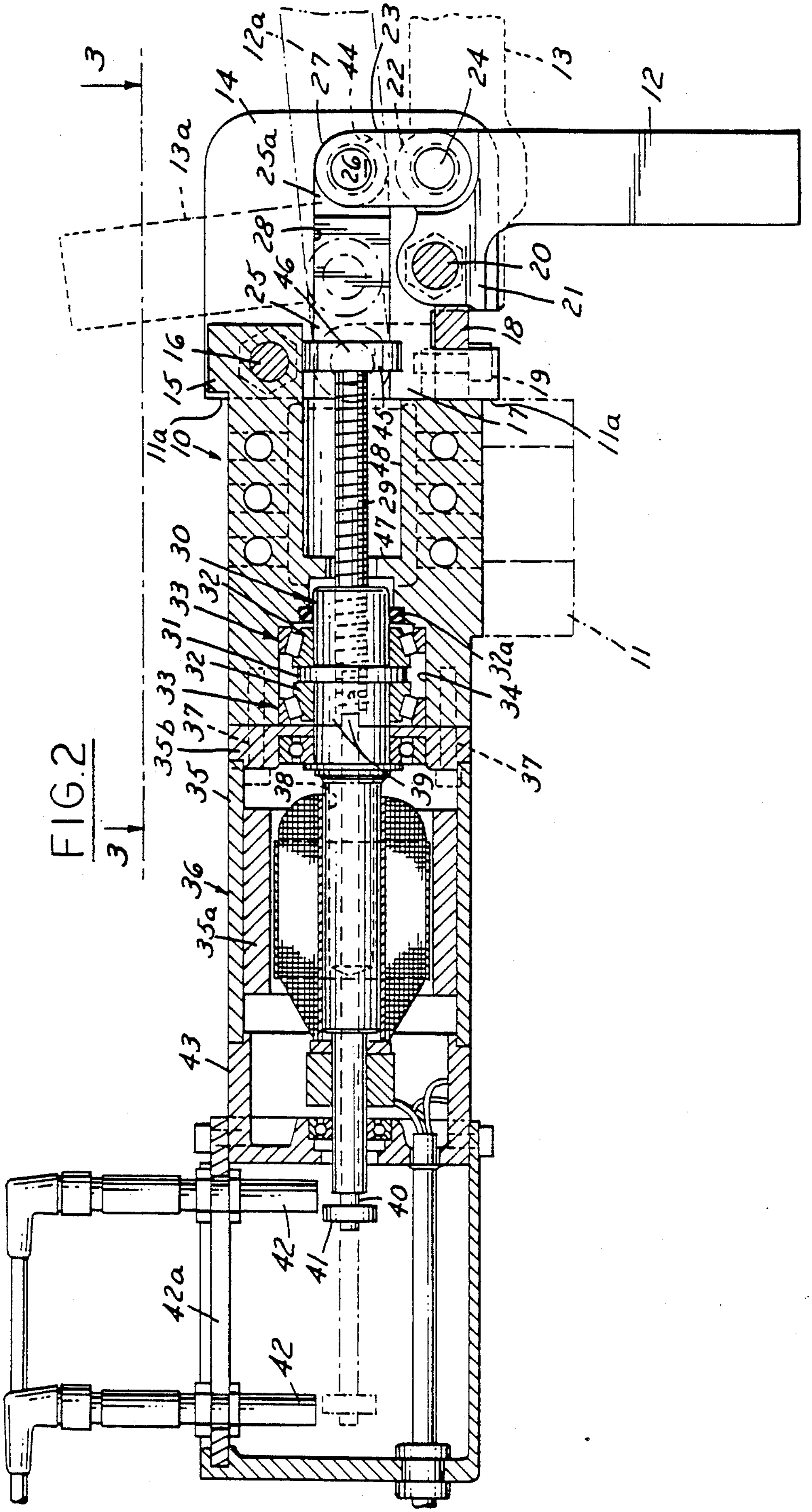
FIG. 2 is a sectional side elevation taken along the line 2—2 of FIG. 1.

With reference to FIGS. 1, 2, and 3, clamp body 10 is adapted for attachment to a fixed base 11 located against registration surface **11*a* of side plates 14 on which a work piece fixture, may be mounted for work piece clamping by clamp arm 12 shown by full line in clamping position and by phantom line 12*a* in retracted position. An alternative straight arm 13, shown in dotted line clamping position, may be retracted to phantom position 13*a*. A pair of roller track side plates 14 rigidly secured to a central integral body extension ear 15 by cross bolt 16 are further secured to a pair of integral side extensions 17 by cross stop key 18 attached to side extensions 17 by bolts 19**.

Clamp arm 12 is pivotally attached to side plates 14 by cross bolt 20 passing through bell crank extension 21 and the narrowed end 22 of clamp arm 12 is attached to a pair of actuating side links 23 by cross pin 24. Side links 23 are also attached to narrowed end **25*a* of threaded rod link actuator 25 by cross pin 26, extensions of which serve as axle for anti-friction needle bearings 27 reciprocable in linear guide tracks 28 provided in roller track side plates 14. Threaded rod portion 29 of link actuator 25 is actuated by drive nut 30, axially retained by shoulder 31 engaging inner races 32 of thrust bearings 33 seated in bore 34 of body 10. A seal 32a retains bearing lubricant within bearing cavity 34. Housing end cap 35b of electric motor 36 is connected to end cap 43 by conventional tie rods, not shown, and is bolted at 37 to the end of body 10. Hollow motor shaft 38 is provided with tang drive 39 to drive nut 30 as best shown in detailed drawings hereinafter described. Hollow shaft 38 accommodates retraction of the threaded rod end 29 of link actuator 25** within the motor body.

Switch rod 40 connected to threaded end 29 of link actuator 25 is provided with adjustable switch trip 41 for accurate adjustment of stroke limits for the electric motor relative to adjustable proximity switches 42 mounted on slotted switch bracket 42a in turn mounted on end cap 43 at the end of motor housing 35.

Figure 6:
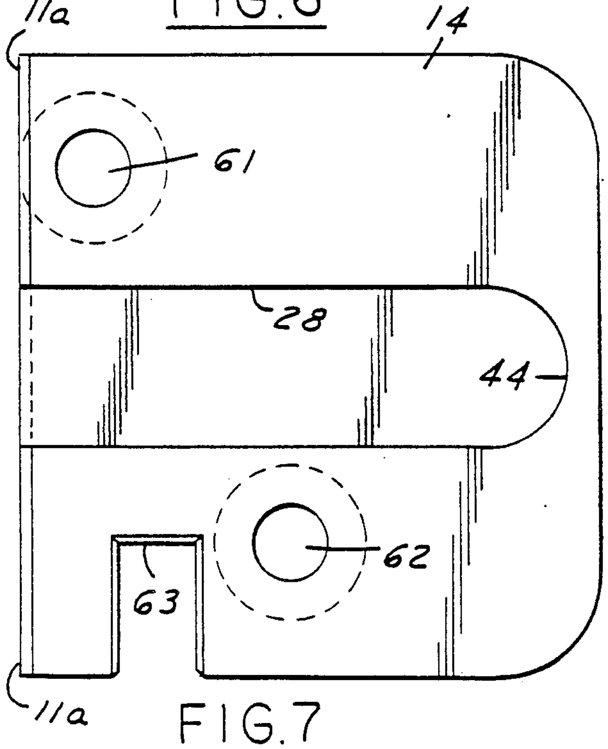
FIG. 6 is an enlarged view of the roller track plate per se illustrated in the assembly views of FIGS. 1, 2, and 3.

In operation, positive stops are effective to limit the clamping stroke by engagement of bearings 27 with arcuate ends 44 of guide tracks 28 best shown in FIG. 6 and upon retraction, by engagement of shoulder 45 of annulus 46 with end 47 of cylindrical bore 48 in body 10. Switch elements 41, 42 are preferably adjusted to permit coasting of the motor in reaching stop engagement of stop surfaces 45 and 47 since only light retraction forces are involved, but with a power-on time delay for assuring positive engagement of rollers 27 with guide slot end 44 before power is cut off.

Figure 4:
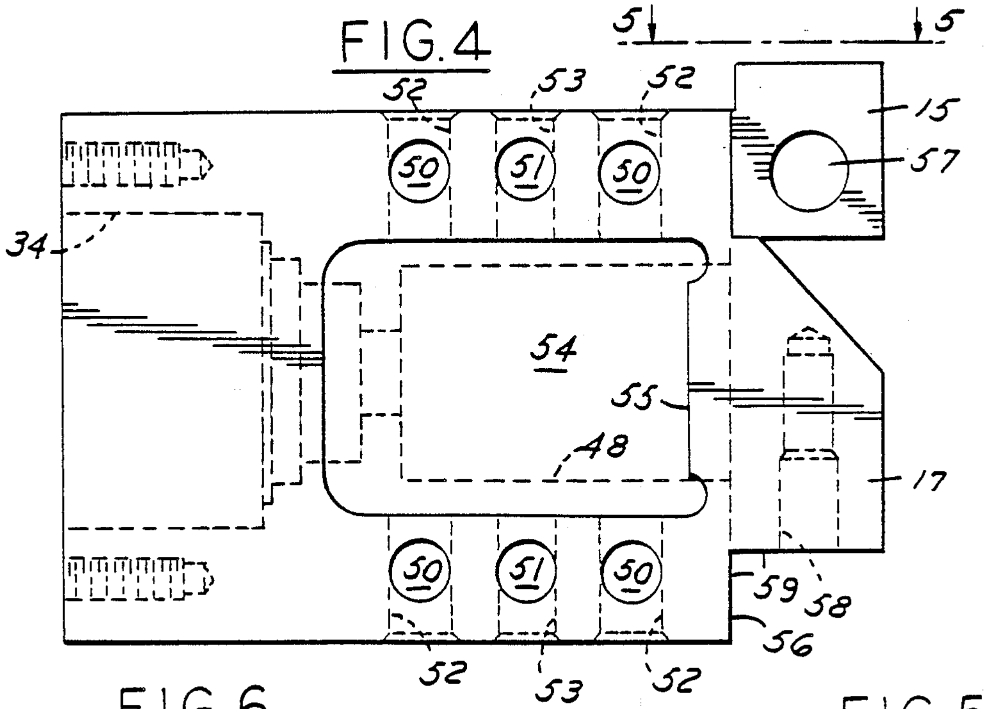
FIG. 4 is an enlarged view of the clamp body per se shown in the assembly of FIG. 2.

While the general operation of the clamp will be understood from the foregoing description, reference to the detailed components illustrated in FIGS. 4–14, shown in enlarged scale, will clarify constructional features of the clamp assembly. With reference to FIG. 4, body 10 is a generally rectangular aluminum casting or machined block having bearing bore 34 provided at one end, plural through cross mounting holes 50 for side mounting bolts, and dowel holes 51 for precision mounting location. Additional right angle mounting holes 52 and dowel holes 53, intersect side pockets 54 provided on either side of the body each of which includes a locating surface 55 which may be employed for certain clamp mountings. Bore 48 extends through to the general body end face 56 and central projection 15 includes cross hole 57 for attachment bolt 16 extending through side roller track plates 14. Tapped holes 58 in side extensions 17 accommodate bolts 19 for attaching key stop 18 within corner recesses 59.

Figure 5:
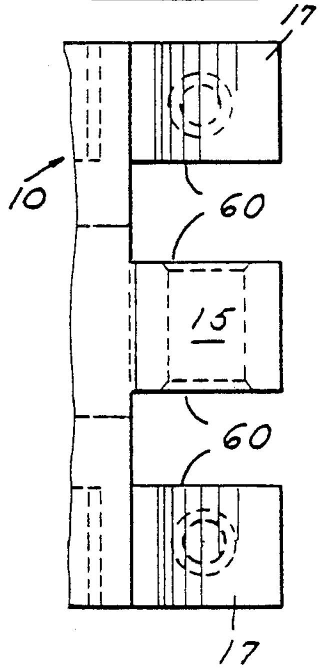
FIG. 5 is a fragmentary plan view taken along the line 5—5 of FIG. 4.
Figures 9, 10, 11, 12, 13, 14:
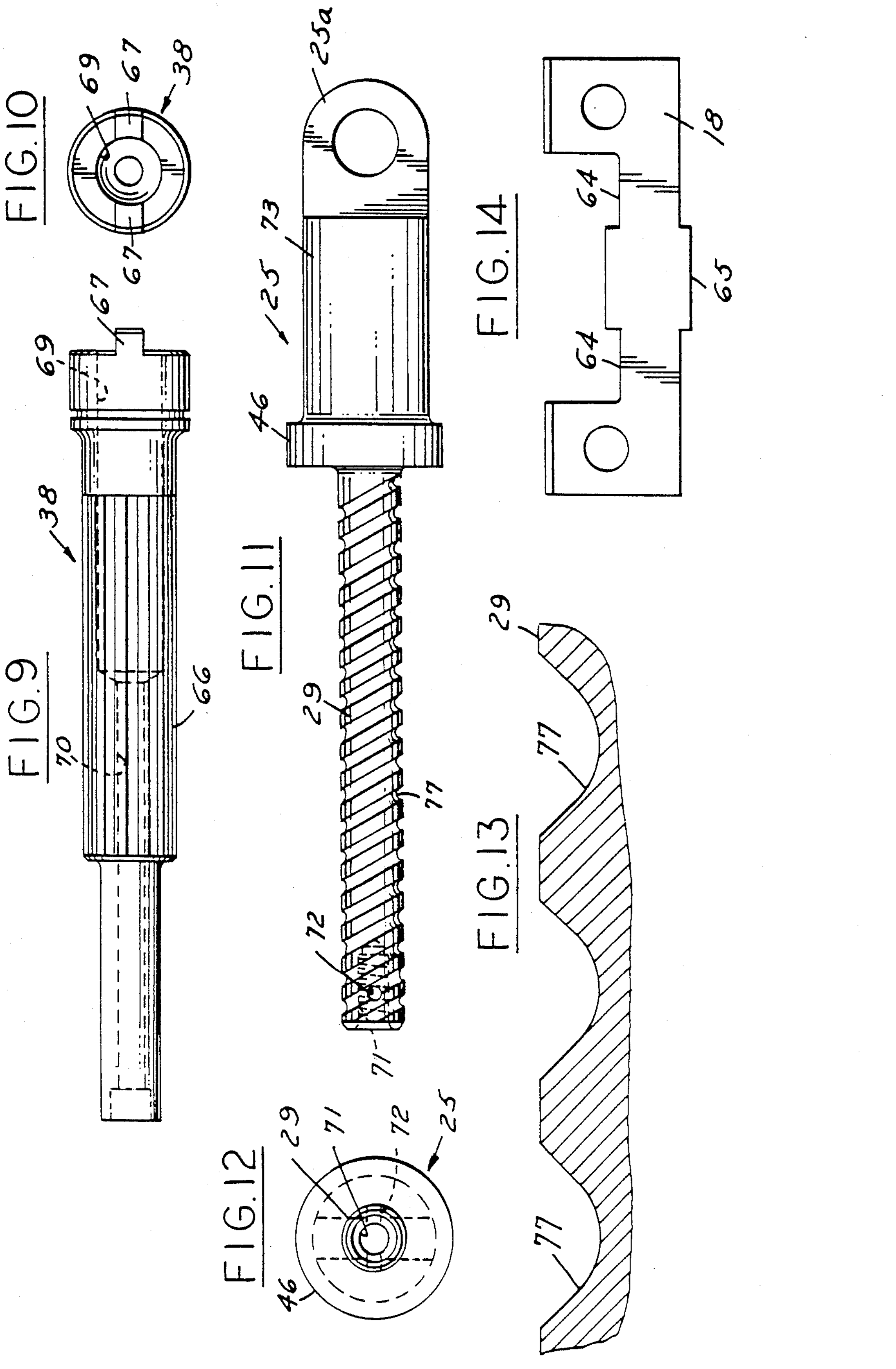
FIG. 9 is an enlarged side elevation of the motor drive shaft shown in FIG. 2.
FIG. 10 is an end view of the drive shaft shown in FIG. 9.
FIG. 11 is an enlarged side elevation of the threaded link actuator shown in FIG. 2.
FIG. 12 is an end view of the link actuator shown in FIG. 11.
FIG. 13 is an enlarged fragmentary sectional view of the thread form employed in the threaded link actuator of FIG. 11.
FIG. 14 is an enlarged plan view of the key stop per se illustrated in the assembly views of FIGS. 1, 2, and 3.

With reference to FIG. 5, the plan view clarifies the width of central projection 15 and side extensions 17 providing space 60 there-between for roller track plates 14, illustrated per se in FIG. 6, each of which is provided wth aperture 61 for attachment bolt 16; and with additional reference to FIG. 14, rectangular notch 63 in each of roller track plates 14 accommodate assembly engagement with narrow sections 64 of key stop 18 which maintains the spacing of the track plates relative to the clamp arm, the bell crank extension 21 of which pivots there-between, and engages stop surface 65 as a pre-stop for setting the clamp in its operative mounted position.

Figure 7:
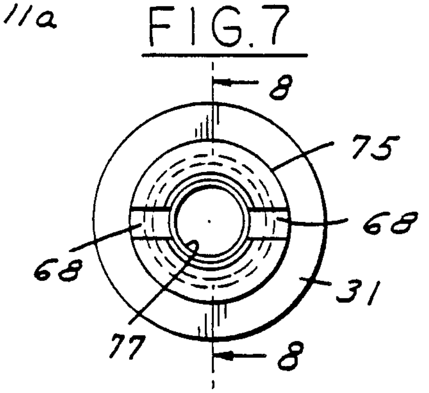
FIG. 7 is an enlarged end view of the drive nut shown in the sectional side elevation of FIG. 2.
Figure 8:
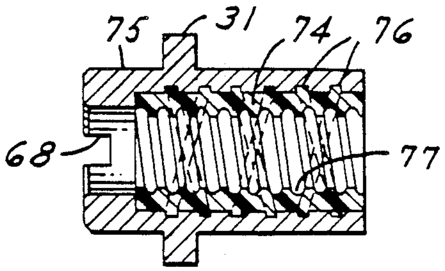
FIG. 8 is a sectional view taken along the line 8—8 of FIG. 7.

With reference to FIGS. 9 and 10, motor shaft 38 is provided with drive spline 66 for receiving motor torque, and drive tangs 67 for engaging slots 68 in nut 30 shown in FIGS. 7 and 8. Counter-bore recess 69 accommodates retraction of threaded end 29 of link actuator 25 and leads to through passage 70 for rod 40 threaded into tapped hole 71 in threaded end 29 with retention provision 72 for set screw or cross pin. Annular shoulder 46 as well as link actuator diameter 73, although greater than the thickness of arm 12 and spacing of roller track plates 14 shown in FIG. 1, have clearance resulting from track 28 recesses so that no interference results from extension of shoulder 46 between plates 14 as shown in FIG. 2.

With further reference to FIGS. 7 and 8, drive nut 30 is provided with a suitable low friction thread material such as bronze, plastic, ball nut or a molded moly-disulphide threaded liner 74 retained in nut housing 75 by cross thread grooves 76, or by base thread form in nut housing 75, and has a special thread form 77, as shown in the greatly enlarged fragmentary view of FIG. 13, molded in place on a master screw. The preferred plastic material is available under the trade name "Moglice" and registered trademark "Diamant" distributed by Moglice Products Inc., as supplied by the German company Diamant Metallplastic GMBH. Such material is characterized by low friction, high strength, durability against wear, and minimal shrinkage in the molding process to assure a substantially perfect fit with full thread engagement and virtually zero backlash in operation.

DESCRIPTION OF MODIFIED EMBODIMENT

Figure 15:
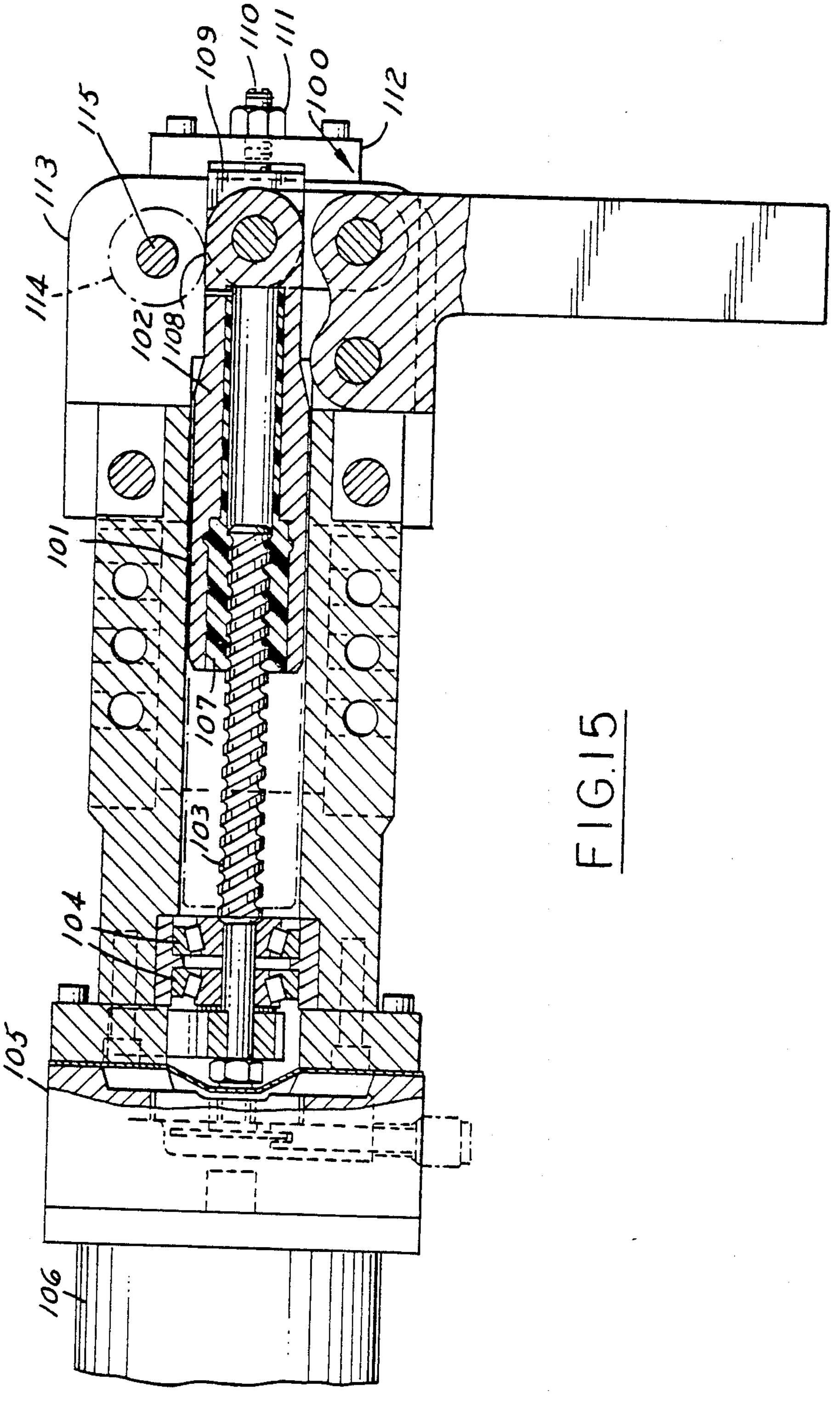
FIG. 15 is a sectional side elevation of a modified embodiment.

With reference to FIG. 15, a toggle clamp mechanism 100 similar to that shown in FIG. 2 is actuated by a reciprocable non-rotating nut 101 connected to adapter link actuator 102 which is motor driven by screw 103 axially retained within thrust bearings 104, with an auxilliary reduction gear drive through gear box 105 provided from electric motor 106. A similar Moglice molded nut thread 107 provides similar drive characteristics with a reversal of the rotating and reciprocating elements.

An adjustment provision for limiting end travel of each roller 108 through pad 109 positioned by adjustment screw 110 having stop nut 111 located in mount bracket 112 attached by suitable means to side plate 113.

An optional lateral reaction provision is illustrated by phantom anti-friction roller 114 mounted on bolt 115 extending through side plates 113 to take the place of track and roller bearings 108.

ADDITIONAL MODIFIED EMBODIMENT

Figure 16:
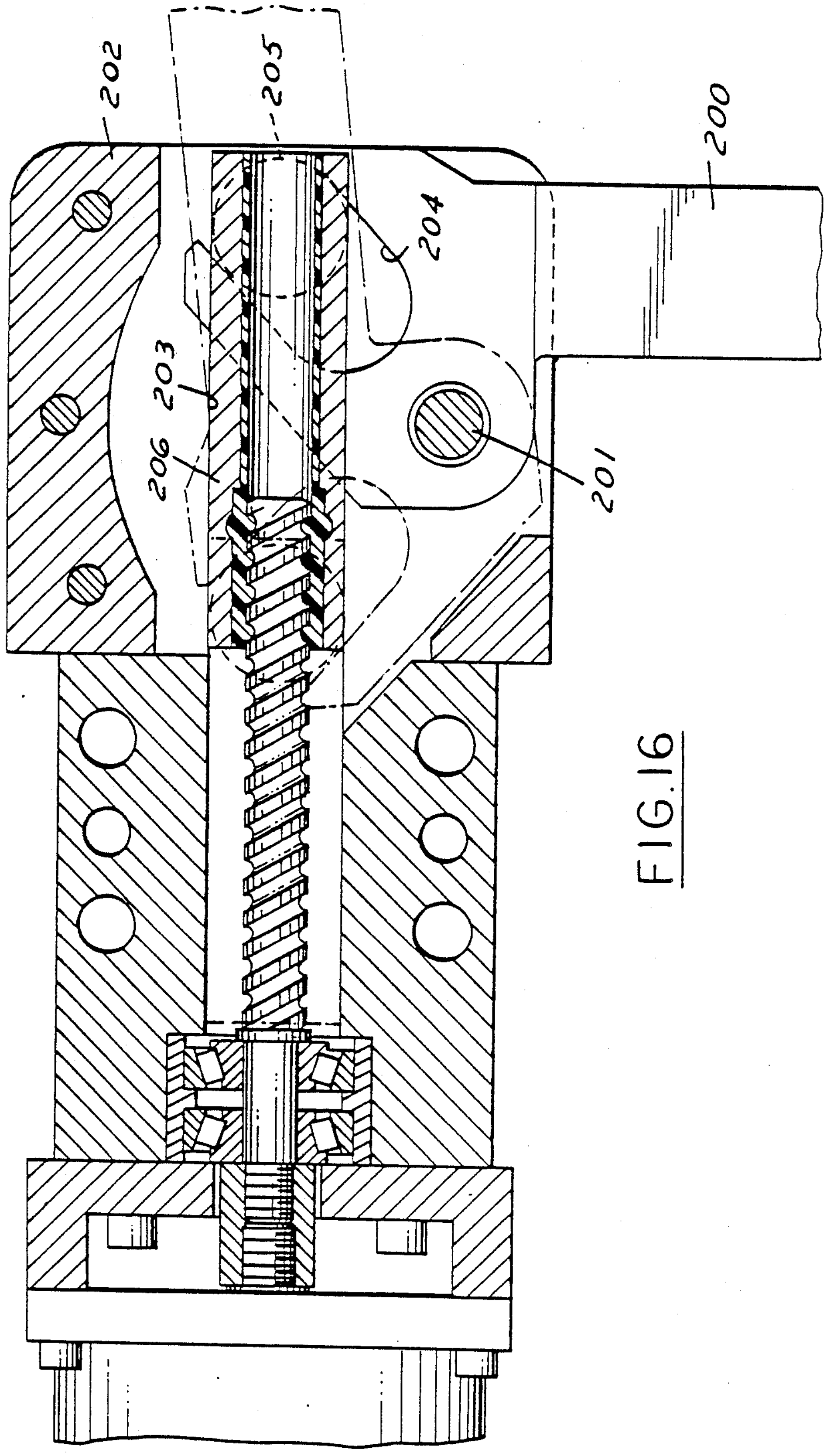
FIG. 16 is a sectional side elevation of a second modified embodiment clamp assembly.

With reference to FIG. 16, a drive unit similar to that illustrated in FIG. 15, is adapted to actuate modified clamp arm 200 pivotally connected at 201 to side plates 202, having slide guide tracks 203 with a "Geneva" type engagement of arm slot 204 by roller 205 suitably driven by drive nut extension 206.

From the foregoing description, it will be understood that any of the modifications may be mounted for clamping position of the arm at any intermediate location of the linkage travel, subject to resultant limitations in mechanical advantage of the linkage with regard to available clamping force, but with assured power-off locking at any position due to the irreversible drive characteristics of the threaded screw actuation and appropriate thrust bearings to absorb clamping pressure reaction. It is also clear that various forms of clamping linkage can be actuated by linear displacement produced by motor drive shaft rotation of a threaded element, axially retained by thrust bearings, engaging a threaded linear element confined against rotation and lateral clamping reaction thrust by linear guide tracks, preferably engaged by anti-friction roller bearings on said linear element.

We claim:

1. Rotary/linear clamp linkage actuator comprising base, reversible rotary motor, drive shaft, threaded nut, threaded rod, linkage, lateral reaction and clamp elements characterized by a rotary and linear drive displacement connection between said nut and rod actuated by axially aligned rotary motor drive shaft and axial thrust retention means for one and axial displacement drive means for the other of said nut and rod elements, said other element having a non-rotational axial drive connection with said linkage and linear guide connection with said lateral reaction element, said linkage having an actuating connection with said clamp.

2. Actuator of claim 1 including a rotary drive connection from said drive shaft to said threaded nut.

3. Actuator of claim 2 including anti-friction thrust bearing means for effecting axial retention of said threaded nut.

4. Actuator of claim 2 including a molded plastic nut thread.

5. Actuator of claim 4 wherein said plastic thread comprises moly-disulphide.

6. Actuator of claim 5 including a plastic thread form having an arcuate root.

7. Actuator of claim 6 wherein said arcuate root extends tangent to angular side flanks.

8. Actuator of claim 7 wherein said side flanks terminate at axially extending flats.

9. Actuator of claim 2 wherein said drive shaft is constructed with an axial bore for receiving said threaded rod upon retractive rotation of said threaded nut.

10. Actuator of claim 9 including a control rod passage extending from said bore to the end of said drive shaft, and including a control rod extending from the end of said threaded rod through said rod passage to an external switch actuating position.

11. Actuator of claim 9 including a link actuator extension of said threaded rod.

12. Actuator of claim 2 wherein said lateral reaction element comprises track means.

13. Actuator of claim 12 wherein said extension is provided with anti-friction rollers engaging in a pair of opposed track elements.

14. Actuator of claim 13 including toggle linkage actuated by said extension.

15. Actuator of claim 13 wherein said base comprises a generally rectangular body said body having means for accommodating mounting on any of four mutually perpendicular adjacent rectangular faces, a bore for seating said thrust bearings, an axial passage for said threaded rod, and means for mounting said pair of said track elements.

16. Actuator of claim 15 wherein each of said track elements is provided with a linear track recess for engagement by an anti-friction roller terminating in a semi-circular end for stop engagement of said roller at the clamping position of said toggle linkage, and a threaded rod extension with a pair of anti-friction rollers mounted thereon engaging said linear track recesses.

17. Actuator of claim 2 wherein said motor shaft comprises a stepped diameter shaft having a splined exterior, counter bore interior, through control rod passage, and tanged drive end.

18. Actuator of claim 16 wherein said threaded rod includes an integral link actuator extension and an apertured end adapted to accommodate a cross pin for mounting anti-friction track engaging rollers.

19. Actuator of claim 15 wherein said base includes an integral extension between said pair of track elements for spacing connection thereto, and a pair of outer side extensions laterally outside of said track elements.

20. Actuator of claim 19 including a key stop element for attachment to said side extensions with means for spacing said track elements in both fore and aft and lateral directions to include clearance space for clamp arm pivotal mounting therebetween.

21. Actuator of claim 1 wherein said lateral reaction element comprises anti-friction means secured to said base engaging said other element.

22. Actuator of claim 21 wherein said anti-friction means comprises a roller bearing engaging said other element.

23. Actuator of claim 1 including adjustable means for limiting the travel of said other element for adjustment of clamping position.

24. Actuator of claim 12 including adjustable means for limiting the travel of said anti-friction rollers for adjustment of clamping position.

* * * * *